Nov. 9, 1965  L. W. BALLARD  3,217,229
ALTERNATOR CURRENT AND VOLTAGE CONTROL
Filed May 8, 1962
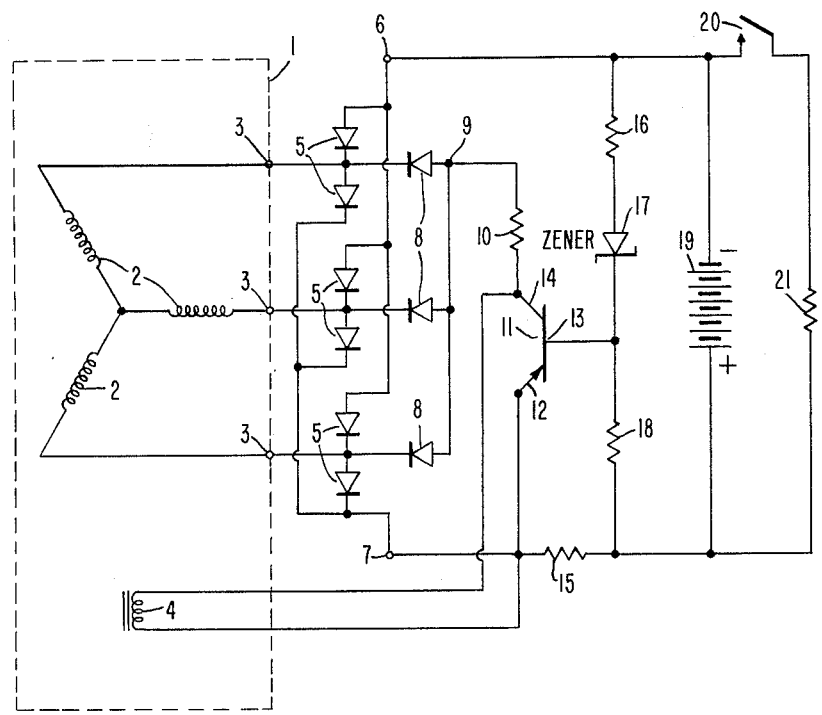
INVENTOR
LYTTLETON W. BALLARD United States Patent Office 3,217,229
Patented Nov. 9, 1965

3,217,229
ALTERNATOR CURRENT AND VOLTAGE
CONTROL
Lyttleton W. Ballard, 10212 E. 69th St., Raytown 33, Mo.
Filed May 8, 1962, Ser. No. 193,215
9 Claims. (Cl. 320—68)

This invention relates to an electrical system consisting of an alternator, a rectifier device or devices, a load to be energized, together with a unique device for controlling both the maximum voltage which can be impressed across said load by said alternator in conjunction with said rectifier devices, and also the maximum current which can be made to flow through said load.

Typical examples of applications in which this invention would be useful are electrical systems of motor vehicles, railroad locomotives, railroad cars and aircraft, all of which are vehicles in which alternators can be required to rotate at velocities which vary greatly due to considerations other than electrical. However, it is the intent of the inventor not to limit the scope of this invention to such applications.

In prior known systems which include regulation of voltage and current, said regulation has been accomplished by means of mechanical relays and vibrators, often in conjunction with resistors of carbon pile or other types. These have sometimes been supplemented by electronic amplifiers and servo controls of comparatively complex nature.

It is an object of this invention to provide a straight forward and reliable current and voltage regulator for an alternator in combination with a rectifier and a load.

In instances where said load may consist, in whole or in part, of a storage battery and/or other storage device under charge, a novel method is used to prevent such a storage device from discharging through said alternator at times when the constant-polarity voltage as rectified from the output of said alternator is less than the voltage of said storage device.

In the example of the use of this invention as portrayed in the drawing, the operation of which will be subsequently described, the representative alternator, the output of which is to be controlled, is of the three-phase type; and the associated rectifier connection is of the full-wave type. It is understood that the scope of this invention also includes systems with alternators other than three-phase and rectifier connections other than full-wave.

Likewise, the representative load to be energized is portrayed as including a storage battery under charge. It is understood that said load could also include any other electrical device or devices being energized by the alternator, with or without said storage battery.

In some applications it might be convenient to rectify that part of the alternator's output which is used to energize the excitation winding by means of rectifiers other than those used to rectify that part of the alternator's output which is used to energize the connected load. The example shown in the drawing and described below is such a circuit, using one set of rectifiers to energize the load and also additional rectifiers to energize the excitation winding. However, the scope of this invention includes also systems using only one set of rectifiers for both load and excitation.

Now, with reference to the drawing, it is first noted that when alternator 1 is either at rest or rotating at low velocities, rectifier devices 5 are so arranged as to prevent discharge of storage battery 19 through any path of said alternator 1.

When alternator 1 is set in rotation by forces from a prime mover, an alternating voltage is developed between terminals 3 of windings 2 of said alternator. In a manner well known to those skilled in the art, aforesaid alternating voltage can result in the presence of a constant-polarity voltage between terminals 6 and 7 of rectifier 5 in the polarity proper for the charging of storage battery 19.

As the velocity of rotation of said alternator increases, the amplitude of said constant-polarity voltage between terminals 6 and 7 may become sufficient to cause a unidirectional flow of current from terminal 7 through the load including storage battery 19 under charge, thence returning to the rectifier through terminal 6, said current also passing through current-sensing resistor 15 in circuit. Depending upon the setting of switch 20, additional current may flow through load resistor 21, said additional current also contributing to the total current through current-sensing resistor 15.

With comparatively small current flowing through current-sensing resistor 15, and with the voltage across the terminals of storage battery 19 insufficient to actuate the voltage reference device 17, which is a zener diode or other voltage reference device, it follows that transistor 11 will be biased in a state where only negligible current flows from its emitter 12 to its base 13 and/or to its collector 14. Under such a condition, a high impedance is presented by transistor 11 as seen in shunt with excitation winding 4.

Rectifier devices 8, in combination with certain of rectifier devices 5, present a voltage of constant polarity between rectifier terminals 7 and 9. This, in turn, causes a uni-directional flow of current from said terminal 7, through excitation winding 4 and resistor 10 in series therewith, thence returning to the rectifiers 8 through terminal 9.

The current through excitation winding 4, for all practical purposes, remains unaffected by transistor 11 until one or both of two phenomena occur(s):

First, if the current through current-sensing resistor 15 exceeds the level for which said current-sensing resistor was chosen, the potential of base 13 of transistor 11 becomes sufficiently negative with respect to emitter 12 thereof to cause a base current to flow from emitter 12 to base 13 and through resistor 18 in circuit. In accordance with proper transistor application, an incremental increase in said base current can be accompanied by a larger incremental increase in collector current within transistor 11. It is immediately seen that said increase in collector current will be accompanied by a corresponding enhancement of voltage drop across resistor 10, this in turn being accompanied by a reduction in voltage across excitation winding 4. Thus, any incremental increase in current through current-sensing resistor 15, above a pre-chosen critical value, is accompanied by an effective shunting of excitation winding 4 by transistor 11. This results in a limitation of the output of alternator 1, and thereby the current through the load is stabilized with an acceptable tolerance of its pre-chosen maximum amplitude.

Secondly, when the voltage across storage battery 19 exceeds the pre-chosen actuating level of voltage reference device 17, an emitter-to-base current is caused to flow from rectifier terminal 7 through the base of transistor 11, and thence to rectifier terminal 6 via device 17 and resistor 16 in circuit. The base current so caused in transistor 11 is accompanied by an effective shunting of excitation winding 4 by transistor 11. This results in a limitation of the output of alternator 1, and thereby the voltage across storage battery 19 is stabilized within acceptable tolerance of the amplitude predetermined by the selection of voltage reference device 17.

Resistor 18 protects other elements of the system from damage in the event that extreme transient currents should occur in current-sensing resistor 15.

Resistor 16 protects other elements of the system against damage in the event that extreme transient voltages should appear across the terminals of storage battery 19.

Whereas, the example shown contains a storage device of a certain polarity and whereas the transistor described is of the P-N-P type, it is immediately clear to those skilled in the art that similar voltage and current regulation could be effected using a N-P-N transistor and/or using a storage device of polarity opposite to that shown. The scope of this invention includes such modifications.

Whereas, load resistor 21 is portrayed as a single element for purposes of explanation, it is understood that it could also be an aggregate of a number of load elements, for example: ignition, lights, signals, heater, communications, and other load elements in an application such as pertains to a motor vehicle. The scope of this invention includes these and other modifications.

The scope of this invention includes systems as portrayed in the drawing but in which alternator 1 might supply with alternating current additional loads as might be connected to terminals 3 over and above the connections thereto shown, said additional loads not actuating the regulating device, but being influenced by the voltage control function of said regulating device.

The scope of this invention includes systems as portrayed in the drawing but in which alternator 1 might supply with uni-directional currents loads as might be connected between rectifier terminals 6 and 7 and/or terminals 7 and 9 in shunt with the connections thereto shown, said additional loads not actuating the regulating device, but being influenced by the voltage control function of said regulating device.

Current-sensing resistor 15 is shown on the drawing as a fixed resistor. It is fully realized that by minor modifications said current-sensing resistor 15 can be made a variable resistor or potentiometer, or could be made to function in conjunction with such variable resistor or potentiometer, to effect a means of adjustment of the maximum current which can be supplied to the load. The scope of this invention includes such modifications.

Voltage reference device 17 is shown on the drawing as a fixed voltage reference device. It is fully realized that by minor modification said voltage reference device 17 could be connected in circuit with a voltage divider including a variable resistor or potentiometer to effect a means of adjustment of the maximum voltage which can be impressed across the load. It is the intent of this invention to include such modifications.

I claim:

1. In an electrical system where generating means is employed to supply constant polarity voltage and unidirectional current to a load, and where said generating means includes an electric generator having a winding that controls the magnitude of the voltage and current supplied by the generator in accordance with the excitation applied to the winding, apparatus for varying said excitation to maintain said voltage and current below preselected levels comprising:

a device having a control terminal and a pair of variable impedance terminals between which the degree of electrical conductivity may be changed by varying an electrical potential applied to said control terminal, said device being normally substantially nonconductive between said variable impedance terminals and being conductive therebetween when said potential applied to said control terminal is within a predetermined range of values;

means for coupling the variable impedance terminals of said device in shunt relationship with said winding;

current-sensing means adapted to be coupled with the output of said generating means for providing a control potential of a value within said range of values when said current reaches said preselected level thereof;

means coupling the control terminal of said device with said current-sensing means, whereby the impedance in shunt with said winding is reduced when the current output of the generating means reaches said preselected level thereof to thereby reduce the excitation current flowing in said winding; and voltage-sensing means operably coupled with the control terminal of said device and adapted to be coupled with the output of said generating means for electrically connecting said control terminal with one electrical side of said output when said voltage reaches said preselected level thereof to apply a control potential to said control terminal of a value within said range of values, whereby the impedance in shunt with the winding is reduced when the voltage output of the generating means reaches said preselected level thereof to thereby decrease the excitation current flowing in said winding.

2. The invention of claim 1, wherein said device comprises a transistor having an emitter element, a base element, and a collector element, said base element presenting said control terminal, the remaining pair of said elements presenting said pair of variable impedance terminals.

3. The invention of claim 1, wherein said voltage-sensing means comprises a component having a pair of electrical connection points between which substantial unidirectional electrical current flows when the electrical potential therebetween is equal to said preselected level of voltage, each of said connection points being adapted for coupling with separate electrical sides of the output of said generating means, said control terminal being connected to one of said connection points.

4. The invention of claim 3, wherein said component is a zener diode having a cathode element and an anode element, each of the elements being coupled with a corresponding connection point.

5. Electrical apparatus comprising:

first and second electrical terminals;

means coupled with said terminals and presenting thereat a source of unidirectional electric current, said means including an electrical generator having a winding operably coupled with the output of the generator for controlling said output in accordance with the excitation applied to said winding;

a transistor having an emitter, a base, and a collector;

an electrical impedance element;

a component having first and second electrical connection points between which substantial unidirectional electrical current flows when the electrical potential applied thereacross reaches a predetermined value;

a storage battery;

means electrically coupling the emitter-collector circuit of said transistor in shunt relationship with said winding;

means electrically coupling said impedance element between said first terminal and said first connection point;

means electrically coupling the base of said transistor with said first connection point;

means electrically coupling the second connection point with the second terminal; and means electrically coupling said battery between said first connection point and the second terminal, whereby the voltage across said terminals and the current in said battery are limited to preselected levels by the action of the transistor in limiting the excitation applied to said winding.

6. The invention of claim 5, wherein said generator comprises an alternator, said source presenting means including rectifier means operably coupling the output of said alternator with said terminals and unidirectional current conducting means operably coupling said output of the alternator with said winding, whereby the storage battery after charging thereof is prevented from discharging through said winding.

7. The invention of claim 5, wherein is provided means electrically interconnecting one electrical side of said winding and said first terminal, said emitter-collector circuit coupling means connecting said emitter to said first terminal, whereby said emitter, said one electrical side of the winding and said first terminal are maintained at the same potential.

8. The invention of claim 7, wherein said first terminal is positive in polarity relative to said second terminal, said transistor being a PNP type transistor, said element being of a value such that said emitter-collector circuit begins substantial conduction when the voltage drop across the element reaches a value corresponding to said preselected level of current in said load.

9. Electrical apparatus comprising:

means provided with positive and negative electrical terminals and presenting thereat a source of unidirectional electric current, said means including an electrical generator having a winding operably coupled with the output of the generator for controlling said output in accordance with the excitation applied to said winding;

means electrically interconnecting one electrical side of said winding and said positive terminal;

a PNP transistor having an emitter, a base, and a collector;

an electrical impedance element;

a zener diode having first and second electrical connection points and including a cathode coupled with said first connection point and an anode coupled with said second connection point;

a load;

means electrically coupling the emitter-collector circuit of said transistor in shunt relationship with said winding with said emitter connected to said positive terminal;

means electrically coupling said impedance element between said positive terminal and said first connection point;

means electrically coupling the base of said transistor with said first connection point;

means electrically coupling the second connection point with the negative terminal; and means electrically coupling said load between said first connection point and the negative terminal, whereby the voltage across said terminals and the current in said load are limited to preselected levels by the action of the transistor in limiting the excitation applied to said winding, said element having a value such that said emitter-collector circuit begins substantial conduction when the voltage drop across the element reaches a value corresponding to said preselected level of current in said load.

References Cited by the Examiner

UNITED STATES PATENTS

| 2,967,251 | 1/61 | Dodge | 323—22 |
| 2,975,352 | 3/61 | Ford | 320—12 |
| 3,026,465 | 3/62 | Hallidy | 322—79 |

FOREIGN PATENTS

| 1,217,082 | 12/59 | France. |
| 1,254,149 | 1/61 | France. |

LLOYD McCOLLUM, *Primary Examiner.*

ROBERT L. SIMS, *Examiner.*